United States Patent [19]
Ross et al.

[11] Patent Number: 5,746,926
[45] Date of Patent: May 5, 1998

[54] METHOD FOR HYDROTHERMAL OXIDATION OF HALOGENATED ORGANIC COMPOUNDS WITH ADDITION OF SPECIFIC REACTANTS

[75] Inventors: David S. Ross, Palo Alto; Indira Jayaweera, Fremont; Roald N. Leif, San Francisco, all of Calif.

[73] Assignee: SRI International, Menlo Park, Calif.

[21] Appl. No.: 632,604

[22] Filed: Apr. 15, 1996

Related U.S. Application Data

[63] Continuation-in-part of Ser. No. 621,746, Mar. 22, 1996.
[51] Int. Cl.$^6$ .................................................. C02F 1/72
[52] U.S. Cl. .................... 210/761; 210/908; 210/909; 210/915; 588/208; 588/213
[58] Field of Search .................................. 210/721, 761, 210/762, 752, 758, 908, 909, 915; 588/208, 213

[56] References Cited

U.S. PATENT DOCUMENTS

| | | | |
|---|---|---|---|
| 4,113,446 | 9/1978 | Modell et al. | 48/202 |
| 4,115,264 | 9/1978 | McCarthy et al. | 210/762 |
| 4,338,199 | 7/1982 | Modell | 210/721 |
| 4,380,960 | 4/1983 | Dickinson | 110/347 |
| 4,543,190 | 9/1985 | Modell | 210/761 |
| 4,564,458 | 1/1986 | Burleson | 210/747 |
| 4,594,164 | 6/1986 | Titmas | 210/741 |
| 5,075,017 | 12/1991 | Hossain et al. | 210/761 |
| 5,200,093 | 4/1993 | Barner et al. | 210/761 |
| 5,232,604 | 8/1993 | Swallow et al. | 210/759 |
| 5,358,645 | 10/1994 | Hong et al. | 210/761 |
| 5,372,725 | 12/1994 | Halff et al. | 210/761 |
| 5,387,398 | 2/1995 | Mueggenburg et al. | 422/168 |
| 5,409,617 | 4/1995 | Ross et al. | 210/762 |
| 5,461,648 | 10/1995 | Nauflett et al. | 376/305 |
| 5,492,634 | 2/1996 | Hong et al. | 210/761 |

FOREIGN PATENT DOCUMENTS

WO81/00854  4/1981  WIPO ................ C10L 1/00

OTHER PUBLICATIONS

L. Jin, et al., Catalytic Supercritical Water Oxidation of 1,4–Dichlorobenzene, *Chem. Eng. Sci.*, vol. 47, No. 9–11, pp. 2659–2664 (1992).

(List continued on next page.)

*Primary Examiner*—Peter A. Hruskoci
*Attorney, Agent, or Firm*—Howard M. Peters; LeeAnn Gorthey

[57] ABSTRACT

This invention relates to a process for the decomposition of material selected from halogenated organic compounds, to compounds which are environmentally acceptable, or are amenable to further degradation by conventional disposal systems to produce environmentally acceptable products, which process comprises: (a) conveying an aqueous solution or an aqueous slurry of material into a reaction zone capable of withstanding the temperatures and pressures of decomposition of the material; (b)contacting the material in the reaction zone with aqueous sodium carbonate as a reactant in an amount effective to decompose the material under hydrothermal oxidation conditions of between about 300° and 400° C. and a pressure of between about 20 and 400 atmospheres for between 0.01 and 120 min wherein the sodium carbonate at the reaction conditions is present at about 10% or less as a water soluble salt as compared to the solubility of the salt at ambient conditions, wherein the process occurs in the presence of a gaseous oxidant wherein said oxidant is present in an amount of between about 0.01 and 50% by weight of the material; (c) producing about 99% or greater of the decomposition of the material, or 99% or greater conversion of the material to compounds which are environmentally acceptable or to compounds which are amendable to further degradation; and (d) optionally degrading further the compounds produced in step (c) by reaction to environmentally acceptable products. Preferably, the specific reactant is sodium carbonate and the oxidant is oxygen or air. Preferably, the halogenated organic compound is selected from polychlorobiphenyl, polybromobiphenyl or chlorobenzodioxin compounds.

18 Claims, 10 Drawing Sheets

OTHER PUBLICATIONS

N. Keevil, "Vapor Pressure of Aqueous Solutions at High Temperature," *J.Am. Chem. Soc.*, vol. 64, pp. 841–850 (1942).

J. Meyer, et al., "Acetic Acid Oxidation and Hydrolysis in Supercritical Water", *AIChE Journal*, vol. 41, No. 9, pp. 2108–2121 (1995).

G. Morey, et al., "Pressure–Temperature Curves in Some Systems Containing Water and a Salt," *J. Am. Chem. Soc.*, vol. 78, pp. 4249–4252 (1956).

B. Foy, et al., "Hydrothermal Processing of Chlorinated Hydrocarbons in a Titanium Reactor", *Environ.Sci.Technol.* vol. 30, pp. 2790–2799 (1996).

METHOD FOR HYDROTHERMAL OXIDATION OF HALOGENATED ORGANIC COMPOUNDS WITH ADDITION OF SPECIFIC REACTANTS

RELATED APPLICATION

This is a continuation-in-part of U.S. Ser. No. 08/621,746 on Mar. 22, 1996, to the same coinventors titled "IMPROVED METHOD FOR HOT AND SUPERCRITICAL WATER OXIDATION OF MATERIAL WITH ADDITION OF SPECIFIC REACTANTS", which is incorporated herein by reference in its entirety.

BACKGROUND OF THE INVENTION

1. Field of the Invention

The present invention relates to an improved method for the hot and supercritical water oxidation and decomposition of materials, such as waste, particularly halogenated organic compounds, using a specific reactant, e.g., a carbonate. The reaction rate is accelerated, acid gases are removed during the reaction, and the usual corrosion of the metal reactors and lines under the operating conditions is eliminated or is greatly reduced.

2. Description of the Problems and the Related Art

In the past a number of methods have been used to decompose materials, which are hazardous or toxic, to products which are innocuous or are environmentally friendly, or to intermediates which can be further degraded using existing secondary material treatment methods. Some alternative practices which have been used include, for example, hot water, supercritical water oxidation (SCWO), wet air oxidation, incineration, molten salt oxidation, plasma arc disposal, hydrothermal liquid oxidation, molten metal pyrolysis, and the like. Each of these methods has their own advantages and disadvantages depending upon the type of material feed stock.

In the chemical area, U.S. industry generates about 1.5 billion tons of hazardous waste each year. This compares to the aggregate of 365 million tons of product production of the 50 largest volume chemical products, or a remarkable 4 tons of hazardous waste per ton of actual product. A large portion of this waste discharge is organic in nature, and a suitable means for its treatment remains a major challenge to the technical community. Presently, U.S. industry must also dispose of 600,000 tons of chlorinated waste each year, which is incinerated in certified incinerators. These incineration units are expensive to operate, and are subject to continuing serious questions of environmental impact of the effluent gases produced.

In the military area, the long-standing question of the safety and public acceptance of incineration for the destruction of chemical weapons is under intense scrutiny. The magnitude of the problem is significant. It is estimated that 31,000 tons of mustard gas agents and nerve gas agents are stored in several U.S. Army installations around the country. In Oregon, the U.S. Army's plans to install an incinerator complex are being opposed by a public group.

In the international arena, the government of Japan is committed to rid China of immense quantities of war gases abandoned there by the Japanese over 50 years ago. It is estimated that some 2 million canisters of poison gases are scattered around China in various stages of decay. The use of incineration is being seriously questioned by Japanese authorities.

The halogenated organic compounds pose a particularly hazardous, toxic and/or environmental threat. Organic halogenated compounds are very rare in nature, and usually are hazardous, e.g. fluoroacetic acid produced in certain plants can cause sickness and death. The compounds having a carbon-halogen bond are usually surprisingly stable to natural decomposition methods. The decomposition of halogenated organic compounds by incineration is highly regulated and limited in the U.S. because the products of incineration, unless rigorously scrubbed, contribute to acid rain, and include chlorodioxins which are highly toxic.

Polychlorinated biphenyls, once having many uses, are highly resistant to decomposition by environmental forces, persistent, and may enter the food chain with disastrous results. Similarly, polybrominated biphenyls, used particularly as flame retardants in plastics and polymers over the years, present a serious disposal problem.

No polyhalogenated biphenyls are produced in the U.S. and in some other countries of the world, and their decomposition to environmentally benign chemicals is the subject of many research projects.

Supercritical water oxidation usually requires high temperatures of about 400° C. or higher. Therefore, it is necessary to have special equipment to safely contain the reaction and to overcome the corrosion problems.

Some specific references include the following:

S. V. Hossain et al. In U.S. Pat. No. 5,075,017 disclose a method for removing polychlorinated benzodioxans and polychlorinated dibenzofurans from paper mill sludge under supercritical or near supercritical conditions.

M. Modell in U.S. Pat. No. 4,338,199 describes a supercritical water oxidation of waste at temperatures of 350° to 600° C.

M. Modell in U.S. Pat. No. 4,543,190 discloses the treatment of various chlorinated organics other than dioxins with supercritical water, and states that conversion of these materials to chlorinated dibenzodioxins was not observed.

Supercritical water oxidation conditions to treat organic waste materials is disclosed in PCT publication WO 81/00854, in Modell, U.S. Pat. No. 4,113,466, in Burleson, U.S. Pat. No. 4,564,458 and in Tilmar, U.S. Pat. No. 4,594,164.

L. Jin, et al. (1992), "Catalytic Supercritical Water Oxidation of 1,4-Dichlorobenzene," *Chem. Eng. Sci.*, Vol. 47, pp. 2659–2664.

N. Keevil (1942), "Vapor Pressure of Aqueous Solutions at High Temperatures," *J.Am. Chem. Soc.*, Vol. 64, pp. 841–850.

J. Meyer, et al. (1995), "Acetic Acid Oxidation and Hydrolysis in Supercritical Water," *AIChE Journal*, Vol. 41, pp. 2108–2121.

G. Morey, et al. (1956), "Pressure-Temperature Curves in Some Systems Containing Water and a Salt," *J. Am. Chem. Soc.*, Vol. 78, pp. 4249–4252.

D. S. Ross, et al., in U.S. Pat. No. 5,409,617 disclose the hydrothermal oxidation of waste materials using certain salts wherein water as a liquid is always present.

P. Savage, et al. (1991), "Phenol Oxidation In Supercritical Water: Formation of Dibenzofuran, Dibenzo-p-dioxin, and Related Compounds," *Environ, Sci. Technol.*, Vol. 25, pp. 1507–1510.

All patents, articles, publications, references, standards and the like cited in this application are incorporated herein by reference in their entirety.

It is apparent that a need exists to overcome slow reaction times, the severe reaction conditions of decomposition of materials, particularly halogenated organic compounds, and also the problem of the corrosion of the equipment used. The present invention provides at least one solution to these problems.

SUMMARY OF THE INVENTION

The present invention relates to a process for the decomposition of material which is selected from the group consisting of organic compounds, inorganic compounds, or combinations thereof to compounds which are environmentally acceptable, or are amenable to further degradation by conventional disposal systems to produce environmentally acceptable products, which process includes:

(a) conveying an aqueous solution or an aqueous slurry of material into a reaction zone capable of withstanding the temperatures and pressures of decomposition of the material;

(b) contacting the material in the reaction zone with aqueous specific reactant, e.g. sodium carbonate, as a reactant in an amount effective to decompose the material under hot or supercritical water oxidation conditions of between about 300° and 600° C. and a pressure of between about 10 and 400 atmospheres for between about 0.1 and 120 min, wherein the specific reactant, e.g. sodium carbonate, at the reaction conditions is present in the medium having about 10% solubility or less of the solubility compared to the solubility at ambient conditions, wherein the process occurs in the presence of a gaseous oxidant, wherein said oxidant is present in an amount of between about 0.1 and 50% by weight of the material, e.g., waste, wherein each carbon atom of the material has at least one oxygen for complete reaction;

(c) producing about 99% or greater of the decomposition of the material, or conversion of 99% or greater of the material to compounds which are environmentally acceptable or to compounds which are amendable to further degradation; and (d) optionally degrading further the compounds produced in step (c) by a secondary reaction to environmentally acceptable products.

In a preferred embodiment, the specific reactant is an inorganic salt which at hydrothermal oxidation conditions is insoluble in the fluid medium having about 10% solubility or less of the solubility compared to the solubility of the salt at ambient conditions, and also reacts with acid gases produced during the decomposition.

In another embodiment, the materials of construction of the reaction zone, i.e., in the reactor, are corroded (or decomposed) at about 0.1% or less under the hydrothermal oxidation conditions, preferably about 0.01% or less, and more preferably about 0.001% or less.

In another embodiment, the material, e.g. waste, comprises at least one organic compound which is present in about 90 percent by weight or greater of the total material.

In another embodiment, at least one organic compound comprises a halogenated organic compound, and the process occurs with less than 0.1 percent corrosion (or decomposition) of the materials of construction of the reaction zone.

In another embodiment, in step (b), the temperature is between about 350° and 450° C. and the pressure is between about 10 and 400 atmospheres, and the time of reaction is between about 0.1 and 120 min.

In another embodiment, the preferred temperature is between about 373° and 400° C., and the presence is between about 100 and 300 atm.

In yet another embodiment the specific reactant is selected from the group consisting of sodium carbonate, calcium oxide, calcium hydroxide, magnesium oxide, magnesium hydroxide, mixtures thereof, and the like. Sodium carbonate is preferred.

In another embodiment, the material is selected from halogenated organic compounds, phosphorus-containing organic compounds, sulfur-containing organic compounds, nitrogen containing compounds or combinations thereof.

In another embodiment, the present invention concerns a process for the decomposition of material selected from halogenated organic compounds to compounds which are environmentally acceptable, or are amenable to further degradation by conventional disposal systems to produce environmentally acceptable products, which process includes:

(a) conveying an aqueous solution or an aqueous slurry of material into a reaction zone capable of withstanding the temperatures and pressures of decomposition of the material;

(b) contacting the material in the reaction zone with aqueous specific reactant, e.g. sodium carbonate, as a reactant in an amount effective to decompose the material under hydrothermal water oxidation conditions of between about 300° and 400° C. and a pressure of between about 10 and 400 atmospheres for between about 0.01 and 120 min, wherein the specific reactant, e.g. sodium carbonate, at the reaction conditions is present in the medium having about 10% solubility or less of the solubility compared to the solubility at ambient conditions, wherein the process occurs in the presence of a gaseous oxidant, wherein said oxidant is present in an amount of between about 0.1 and 50% by weight of the material, e.g., waste, wherein each carbon atom of the material has at least one oxygen for complete reaction;

(c) producing about 99% or greater of the decomposition of the material, or conversion of 99% or greater of the material to compounds which are environmentally acceptable or to compounds which are amendable to further degradation; and (d) optionally degrading further the compounds produced in step (c) by a secondary reaction to environmentally acceptable products.

The following embodiments concern halogenated organic compounds selected from chlorofluorocarbon, chlorobenzodioxins, polychlorobiphenyl, polybromobiphenyl or mixtures thereof. Polychlorobiphenyls are preferred.

In a preferred embodiment, the specific reactant is an inorganic salt which at hydrothermal oxidation conditions is insoluble in the fluid medium having about 10% solubility or less of the solubility compared to the solubility of the salt at ambient conditions, and also reacts with acid gases produced during the decomposition.

In another embodiment, the materials of construction of the reaction zone, i.e., in the reactor, are corroded (or decomposed) at about 0.1% or less under the hydrothermal oxidation conditions, preferably about 0.01% or less, and more preferably about 0.001% or less.

In another embodiment, the material, comprises at least one halogenated organic compound which is present in about 90 percent by weight or greater of the total material.

In another embodiment, at least one halogenated organic compound comprises an aromatic halogenated organic compound, and the process occurs with less than 0.1 percent corrosion (or decomposition) of the materials of construction of the reaction zone.

In another embodiment, in step (b), the temperature is between about 350° and 400° C. and the pressure is between about 10 and 400 atmospheres, and the time of reaction is between about 0.01 and 120 min, preferably, between about 0.01 and 20 min, more preferably between about 0.1 and 20 min.

In another embodiment, the preferred temperature is between about 373° and 400° C., and the pressure is between about 100 and 300 atm.

In yet another embodiment the specific reactant is selected from the group consisting of sodium carbonate, calcium oxide, calcium hydroxide, magnesium oxide, magnesium hydroxide, mixtures thereof, and the like. Sodium carbonate is preferred.

In another embodiment, the halogenated organic compound is selected from polychlorinated biphenyl, polybrominated biphenyl or mixtures thereof. Polychlorinated biphenyl is preferred.

BRIEF DESCRIPTION OF THE FIGURES

FIGS. 9A, 9B, 9C and 9D show the experimental results in gas chromatographic trace of response vs. time.

DETAILED DESCRIPTION OF THE INVENTION AND PREFERRED EMBODIMENTS

Definitions

As used herein:

"CFC" refers to special halogenated organics, the chlorofluorocarbons, preferably those CFCs which are used in the refrigerator or air conditioning (home, office, plant/manufacturing facility, or motor vehicle). The commercial CFCs include but are not limited to volatile substituted methane or ethane, for example, dichlorodifluoromethane, chlorodifluoromethane, sym-dichlorotetrafluoroethane, and the like.

"Chlorodioxin" refers to mono or polychlorinated benzodioxin structures.

"DCB" refers to dichlorobenzene.

"Halogenated organic compound" refers to those aliphatic and aromatic and aliphatic-aromatic organic compounds, which have a halogen atom selected from fluorine, chlorine, bromine or iodine. Usually, the organic compound contains one or more chlorine atoms. Halogenated organic compound includes, but are not limited to, CFCs (see above), cleaning solvents such as methyl chloroform, 1,1,2-trichloroethylene; PCBs; PBBs, including pesticides, herbicides, etc.

"HG" refers to a mustard war gas.

"Hot water" refers to water at temperatures of about 300° C. or greater, preferably about 330° C. or greater, more preferably about 350° C. or greater, to 400° C.

"Material" refers to organic compounds, inorganic compounds, organometallic compounds and combinations thereof. Usually, the material is a waste or a reaction by-product. Organic compounds are preferred. "Material" includes organic compounds, having one or more atoms of nitrogen, sulfur phosphorous oxygen and combinations thereof.

"Organic nitrogen compounds" as materials include, but are not limited to, aniline, nitrobenzene, nitrotoluene, dinitrotoluene, trinitrotoluene, nitroglycerin, pentaerythrityl, tetranitrate, picric acid or combinations thereof.

"Organic phosphorus compounds" refer to, but are not limited to, phosphoric acids, alkyl phosphonates, aryl phosphonates, or combinations thereof.

"Organic sulfur compounds" refer to, but are not limited to, organic sulfonic acids, alkyl mercaptans, $H_2S$, alkyl sulfates, aryl sulfates, or combinations thereof.

"Oxidant" refers to an oxidizing agent which is a gas at the reaction conditions. Oxidants include air, oxygen, ozone, hydrogen peroxide, combinations thereof, and the like. Active oxidant is present at in between about 0.1 to 200 wt % of material present, preferably between about 0.1 to 100 wt %, and more preferably between 0.1 and 50 wt %. Each carbon atom of the material to be decomposed requires at least one oxygen molecule for complete reaction to $CO_2$.

"2,2',4,5,5'-Pentachlorobiphenyl" refers to the following structure:

"Polyhalogenatedbiphenyl" refers to the structure:

wherein $R^1$ to $R^{10}$ are independently selected from hydrogen, —Cl, Br or combination thereof, with the proviso that at least one $R^1$ to $R^{10}$ is —Cl or —Br. Preferably, at least two of $R^1$ to $R^{10}$ are —Cl or —Br. Polychlorinated biphenyl is preferred wherein each aromatic ring has at least one —Cl.

"SARIN" refers to a phosphorous containing war gas.

"Specific reactant" refers to a compound which is consumed during the reaction and usually accelerates the reaction. Specific reactant is one which is essentially insoluble in the fluid medium at supercritical conditions, and reacts to neutralize acid gases produced during the decomposition. Preferred specific reagents include, for example, sodium carbonate, calcium oxide, calcium hydroxide, magnesium oxide, magnesium hydroxide and combinations thereof. Sodium carbonate is preferred.

"2, 2', 4, 4'-Tetrachlorobiphenyl" refers to the following structure:

In the SCWO literature for decomposition of a hazardous halogenated organic, e.g. tetrachlorobenzodioxin, in the presence of an oxidant, such as oxygen, the reaction is slow and produces acid, hydrogen chloride, which corrodes the materials of construction of the reaction.

Figure 3:
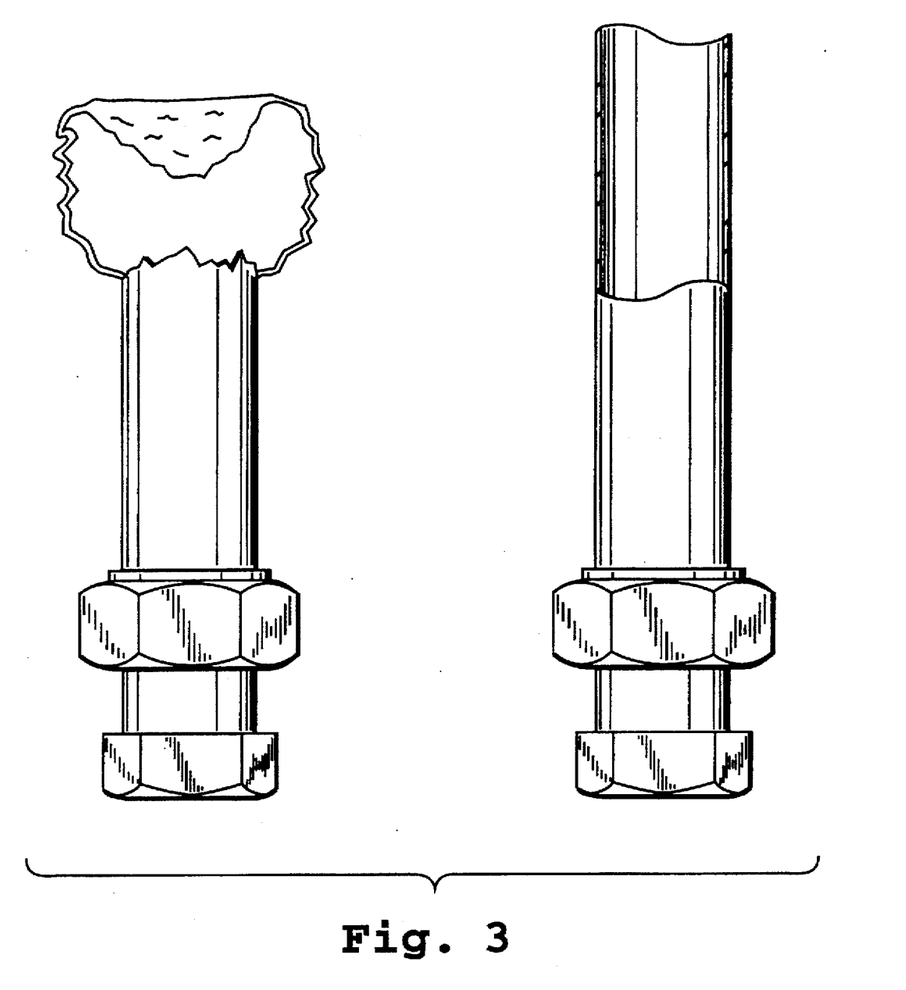
FIG. 3 is a photograph showing on the left side the corrosion and failure of a pipe during conventional SCWO of dichlorobenzene at 374° C., having 0.12 Molar of p-dichlorobenzene and 0.72 Molar of oxygen, and on the right side the lack of corrosion in a pipe of a sodium carbonate (3 g) (0.5M or $1.4 \times 10^{-3}$ moles in 3 mL) assisted hydrothermal oxidation of p-dichlorobenzene under the same conditions.

See below and FIG. 3, left side.

Figure 1:
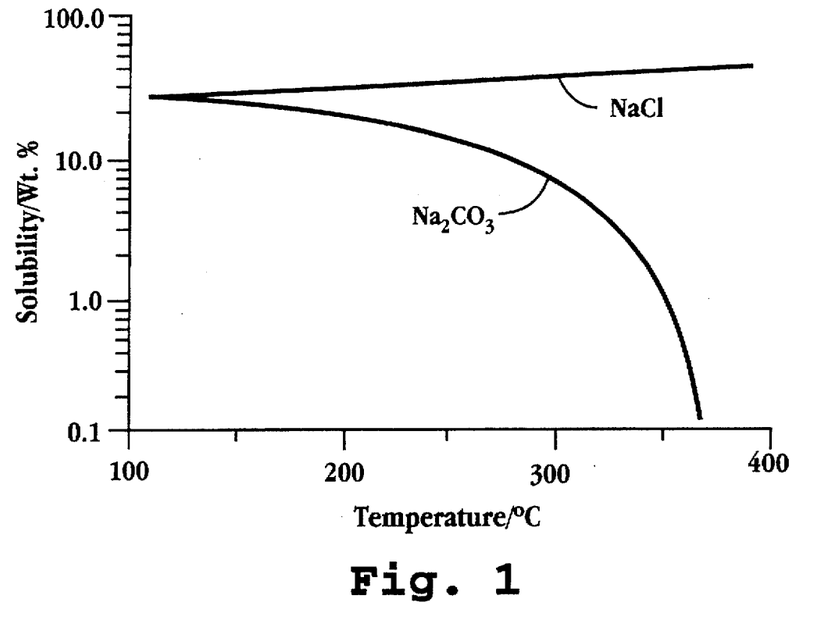
FIG. 1 is a graph describing the solubility behavior of sodium chloride (soluble) and specific reactant, e.g. sodium carbonate, which is about 90% insoluble at 300° with the water at conditions along the liquid/vapor line and essentially insoluble in the fluid (gaseous water) at or above the critical temperature of water (373° C.).

In the present technology, the solubility behavior of various salts in liquid water at elevated temperatures is important, as shown in FIG. 1, which is created from data by Keevil (1942) and Morey, et al., (1956). FIG. 1 shows the continuing solubility increase in the medium with increasing temperature of sodium chloride up to 400° C. This solubility at elevated temperatures in the water medium is reflected in the behavior of the majority of common salts, including sodium bromide, sodium iodide, sodium nitrate, and most potassium salts, including potassium carbonate. As FIG. 1 shows, these saturated salt systems avoid critical behavior, do not improve the reaction, and form no part of this invention.

In direct contrast to this solubility behavior of various inorganic salts, the solubility of a specific reactant, such as sodium carbonate, in water medium rapidly decreases at higher temperatures, specifically at about 300° C., at about 350° C. and above, and to and above the critical temperature of water at 374° C. Critical behavior is observed with specific reactants, such as sodium carbonate, which are about 90% insoluble in water medium at 300° C., and which become essentially insoluble in the aqueous medium at and above the critical temperature of 374° C. at 220 atm. A few other salts behave in a similar way, including calcium oxide, calcium hydroxide, sodium sulfate, sodium fluoride, and sodium triphosphate.

In another aspect of the specific reactant as present in the reaction, it serves to react and neutralize any acid gas produced in the decomposition.

Figure 2:
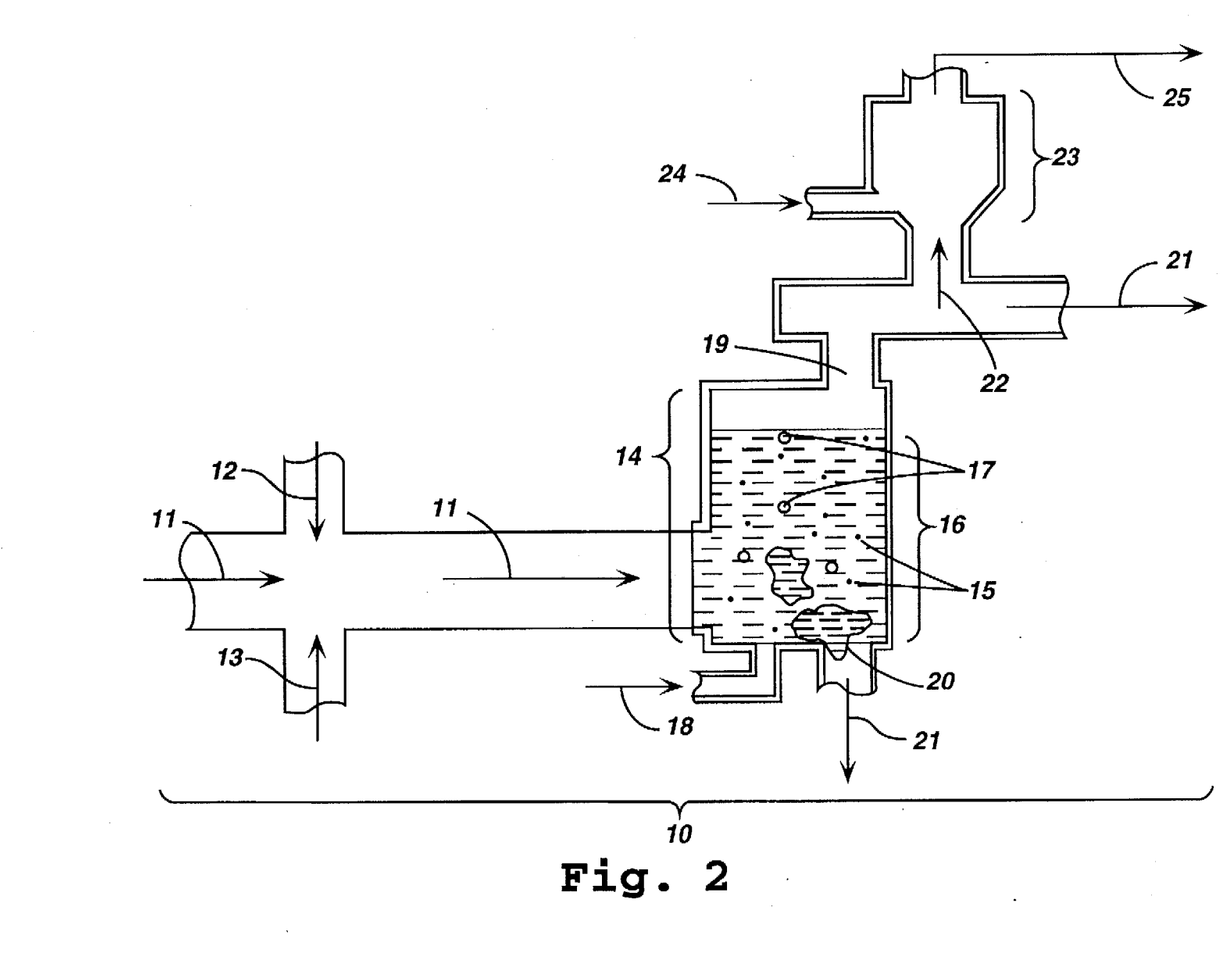
FIG. 2 is a schematic representation of one embodiment of the present hot water and SCWO oxidation.

In FIG. 2 of one embodiment of the present process, equipment configuration (10) is shown in which hydrothermal water oxidation is essentially carried out using a fluidized bed of specific reactant. The incoming feed stream (11) of waste material (12) as a solid, solution, or slurry, added specific reactant as a solid or slurry (13), such as sodium carbonate, and water (14) is heated in reaction zone 15 to about 300° to 600° C., at between about 10 and 400 atm, e.g. 380° C./220 atm, or above the critical point of water. The specific reactant, e.g. sodium carbonate, is insoluble in the fluid and is effectively a reactive fluid bed (16), fluidized by the mixture of water and oxidant (air or oxygen) (as stream 17) entering from the bottom of unit 15. The surface area of reactant, e.g. sodium carbonate is about 180 cm$^2$/g or higher. The surface activity of the specific reactant at these conditions (i.e. suspended in a supercritical water medium at liquid densities at a temperature where its solubility drops essentially to zero) is substantial, and converts the waste materials readily and rapidly to simple oxygenates. These oxygenates exit reaction zone (15) at opening (19) and are then rapidly oxidized to carbon dioxide (20) with the oxygen present. Dense brine (e.g. NaCl, NaNO$_3$, etc.) (18) exits at the bottom of the reaction zone (15). Water (21) is separated and optionally is recycled at to incoming stream 17. Specific reactants, such as sodium carbonate, are commercially available, are inexpensive, and are therefore a suitable consumable reactant. The cost of the present process using sodium carbonate as the specific reactant and oxygen as the oxidant is estimated to be about $0.08 per gallon at a rate of 300 gallon per minute (gpm).

A large range of materials can be treated with this technology, including, but not limited to: waste, ordnance, chemical warfare agents, energetic materials, explosives, paint sludges, chlorofluorocarbons, various polymer wastes, phosphorous organic compounds, nitrogen-organic compounds, sulfur organic compounds, halogenated wastes, e.g. cleaning solvents, dairy waste, pharmaceutical waste, food waste (as described in U.S. Pat. No. 5,409,617) and the like.

In the optional final step, the product stream 20 is passed through a secondary decomposition process 22 such as, for example, a commercial oxidizer, e.g., a Thermatrix Flameless Oxidizer, available from Thermatrix, Inc. of San Jose, Calif., having an air inlet 23 which completes the conversion of any trace, nonacceptable volatile gases which are not eliminated in the fluid bed, thus assuring an acceptable exhaust stream (24).

Figure 4:
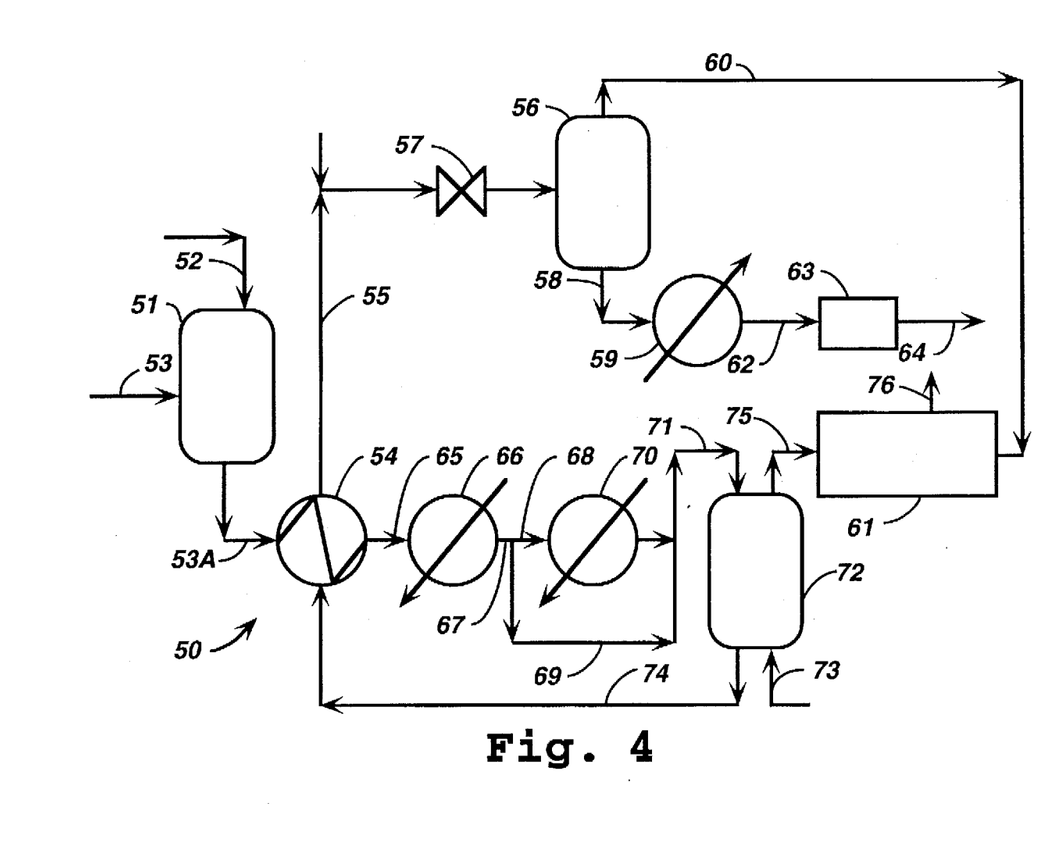
FIG. 4 is a schematic representation of another embodiment of the present hot water and SCWO oxidation.

FIG. 4 is another embodiment of the present process having equipment configuration (50). To feed vessel 51 is added solid or aqueous specific reactant 52, such as sodium carbonate, and material 53 to be decomposed, usually in a water solution. The mixture in vessel 51 is conveyed to economizer 54 via line 53A where the mixture is heated to about 300° to 600° C. at about 10 to 400 atm. A portion of the water is removed from the reaction mixture at elevated temperature and conveyed via line 55 to be added to water heater 56 through valve 57, and through line 58 to flash vessel 59. If necessary, a portion of the high boiling liquid is conveyed through line 60 to the secondary decomposition reactor 61. As necessary, a portion of the liquid in flash vessel 59 is conveyed through line 62 to brine cooler 63 which exits via line 64 to the environment. The major portion of the reaction mixture in economizer 54 is conveyed via line 65 to preheater 66. The reaction mixture exits preheater 66 via line 67 and is split into line 68 which leads to a start up heater 70, and line 69, which leads via line 71 to hydrothermal reactor 72. In reactor 72, the reaction mixture is heated to about 300° to 600° C. under pressure in the presence of an oxidant entering reactor 72 via line 73. A portion of the reaction product is recycled to economizer 54 via line 74. The effluent gases exit reactor 72 via line 75 to a secondary decomposition unit 61, e.g. a Thermatrix unit. The acceptable gases are produced and vented to the environment via line 76.

Sodium carbonate, when added to an aqueous reaction mixture and heated as is described herein, readily converts chlorinated organics, such as tetrachlorobenzodioxin or polychlorinated biphenyls (PCBs).

NaCl, $CO_2$, $H_2O$

Polyhalogenatedbiphenyl

A model compound to study the oxidation and decomposition of chlorodioxin, e.g. tetrachlorobenzodioxin or polychlorinatedbiphenyl is ρ-dichlorobenzene (DCB).

p-dichlorobenzene

Figure 5:
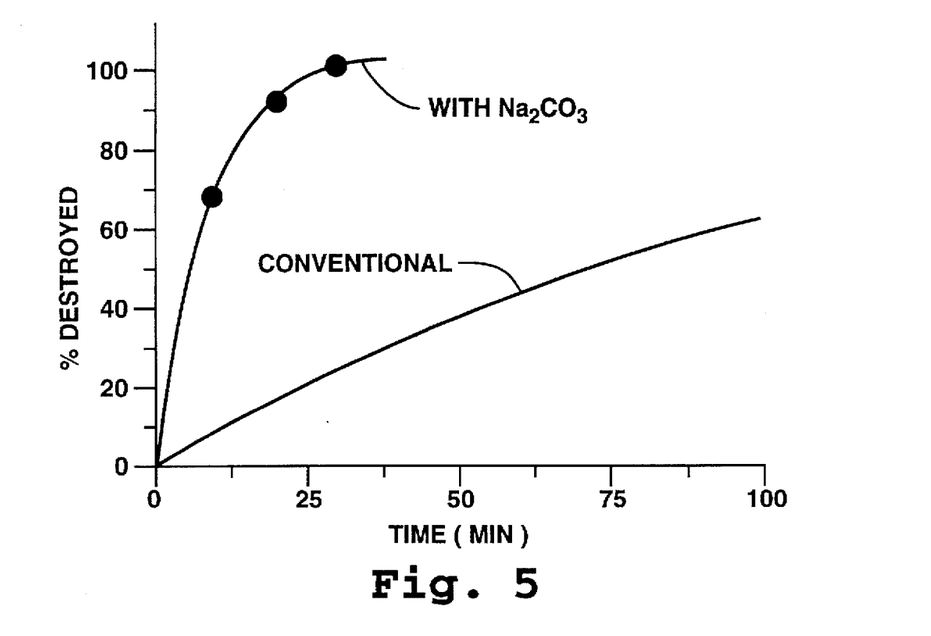
FIG. 5 is a graph representation of the percent of dichlorobenzene destroyed under supercritical water oxidation conditions at 380° C. for specific times of reaction.

The studies were conducted in small stainless steel reactors, and the results are presented in FIG. 5. FIG. 5 compares the results with a rate profile projected to our conditions based on the reaction kinetics reported for the conventional, supercritical water oxidation of DCB by Jin et al. (1992). This approach yields a substantially accelerated decomposition rate, and the process appears to be thorough, with the isolated product mixture from a 27-min sodium carbonate reaction showing a total organic carbon (TOC) content of <0.04%. Total conversion of organic chlorine to chloride ion is also achieved.

The hydrogen chloride removal in the presence of specific reactants was demonstrated in comparison to reactions duplicating the results of Jin et al. (1992) using large, practical levels of DCB. In two separate SCWO reactions, large quantities of HCl were produced which corroded the interior reactor surfaces to the point of failure (rupture) during reaction (See FIG. 3 on the left). On the other hand, the reactor used at the conditions of the present invention with specific reactant present was unaffected after several reactions (See FIG. 3 on the right).

Figure 9A:
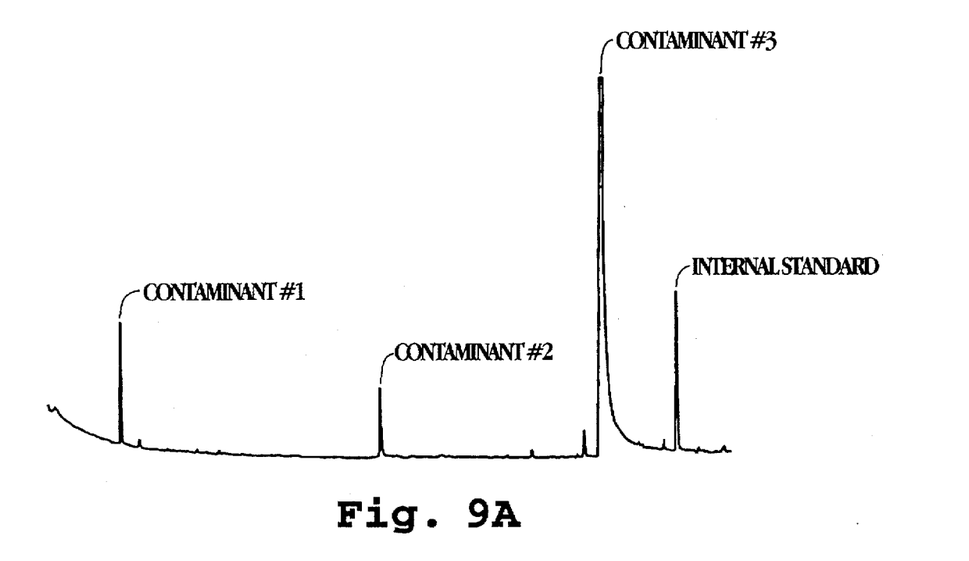
FIG. 9A is the result of a method blank showing contaminants.
Figure 9B:
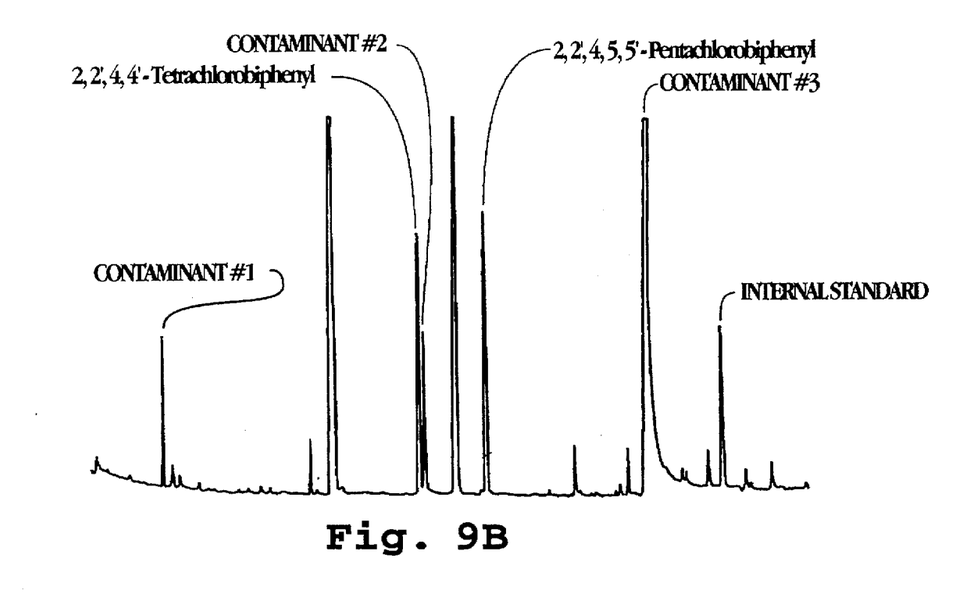
FIG. 9B shows the result of a 5 min reaction at 380° C. of water only having a PCB level of 200 µg/L.

The result of the decomposition of two PCB cogeners (Model compounds I and II, see definitions above), are presented in FIGS. 9A to 9D. FIG. 9A shows the results of a control reaction in which all of the extraction and analytical steps were performed, but the sample contained no added PCBs. FIG. 9A shows a level of contamination developed, but, fortunately, no contaminant peak interfered with the PCB peaks. The clean PCB detection is shown in FIG. 9B, which was a control reaction conducted with no added carbonate. In this reaction, greater than 60% of the starting PCBs were recovered.

Figure 9C:
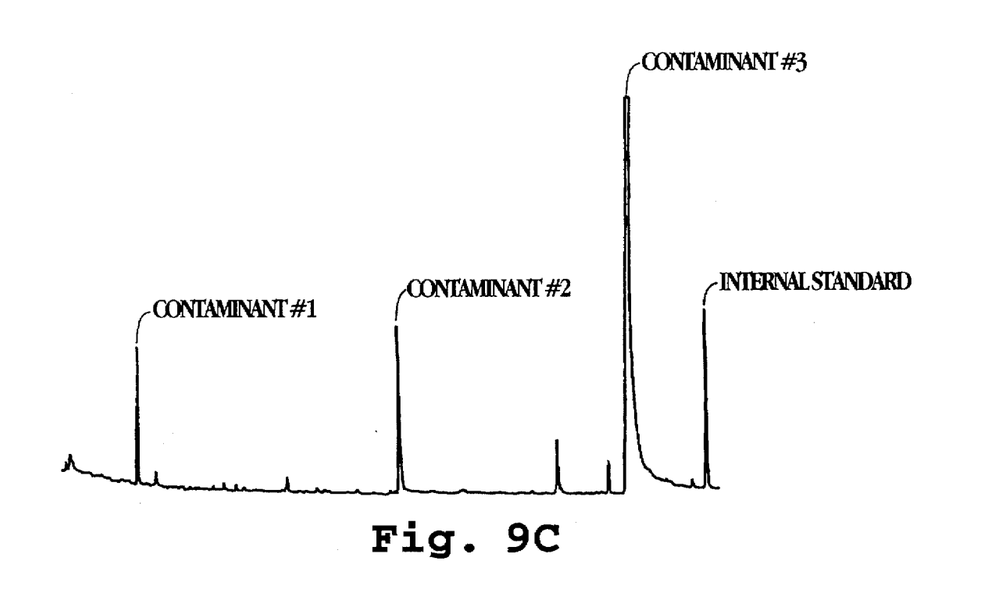
FIG. 9C shows the result of a 5 min reaction at 380° C. for water and sodium carbonate (500 mg) having an initial PCB level of 200 µg/L.
Figure 9D:
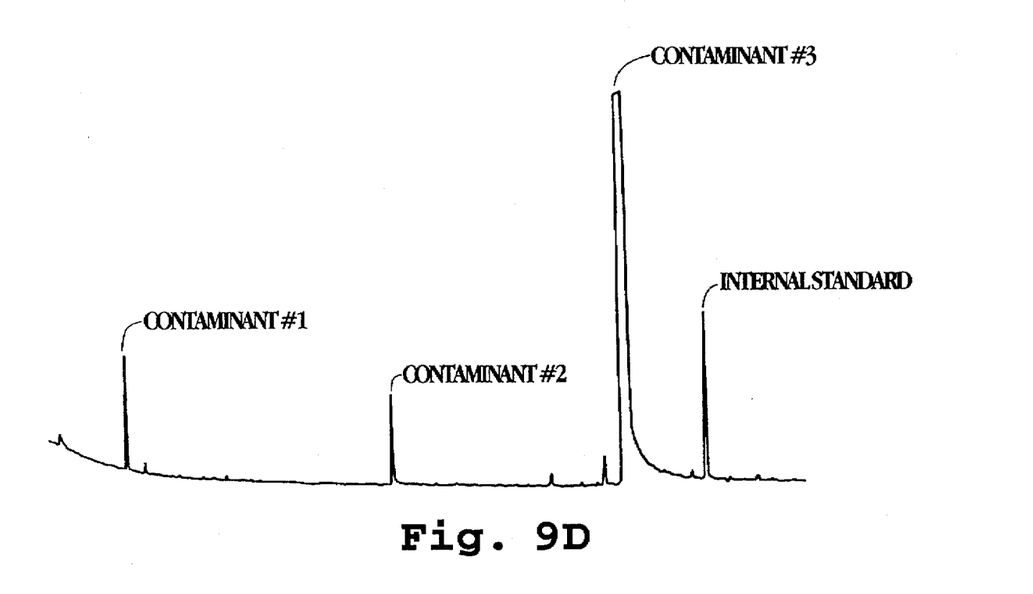
FIG. 9D shows the result of a 5 min reaction at 380° C. for water and sodium carbonate (500 mg) having an initial PCB level of 20,000 µg/L.
Figure 10:
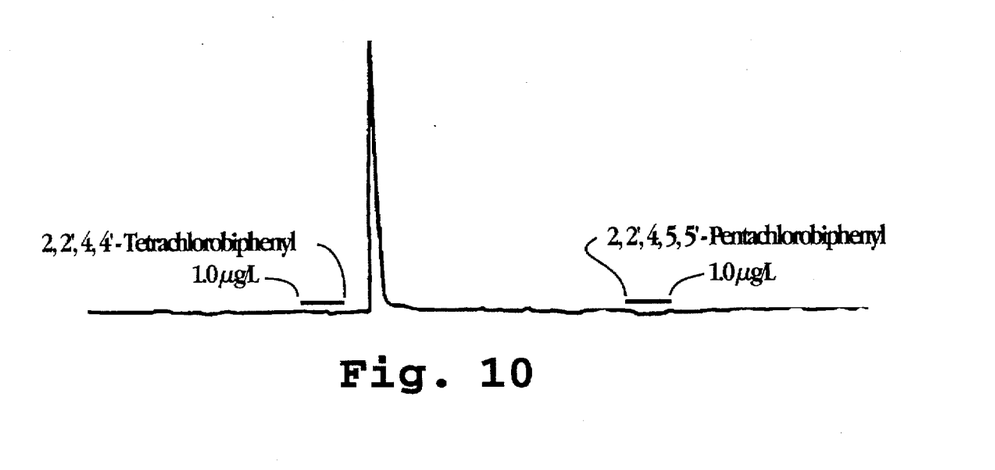
FIG. 10 is an enlargement of a portion of FIG. 9D which shows the remaining PCB level to be about or less than 1 µg/L.

The reduction in PCB quantities is shown in FIGS. 9C and 9D for the two different loading levels. Close inspection of the trace shows barely detectable PCB quantities at less than 1 μg/L. The result may be difficult to see in figure, but an enlarged portion of FIG. 9D is presented as FIG. 10, and the findings are surprising. The responses for PCBs are well below 1 μg/L, the levels for which have been sketched in.

The hydrothermal oxidation and decomposition of the polyhalogenatedbiphenyl compounds preferably polychlorinatedbiphenyl occurs between 300° and 400° C., preferably between 350° and 400° C. and more preferably between 375° and 400° C. For this decomposition the specific reactant, preferably sodium carbonate, is present in at least a stoichiometric amount. For halogenated aromatic organic compounds once a halogen has been converted to a hydroxyl group, the oxidation of the "phenol" occurs rapidly in the presence of the oxidant. The amount of water is present to obtain the reaction conditions and can be determined by one of skill in the art. The amount of oxidant, preferably air or oxygen, is present in an amount to oxidize the organic compound to carbon dioxide, water or intermediates which are readily degraded by secondary disposal methods. the levels of oxidant are determined by one of skill in this art by knowing the result to be achieved.

Decomposition with Specific Reactant in the Absence of Water

Hexachlorobenzene is a common fungicide.

Hexachlorobenzene

Figure 6:
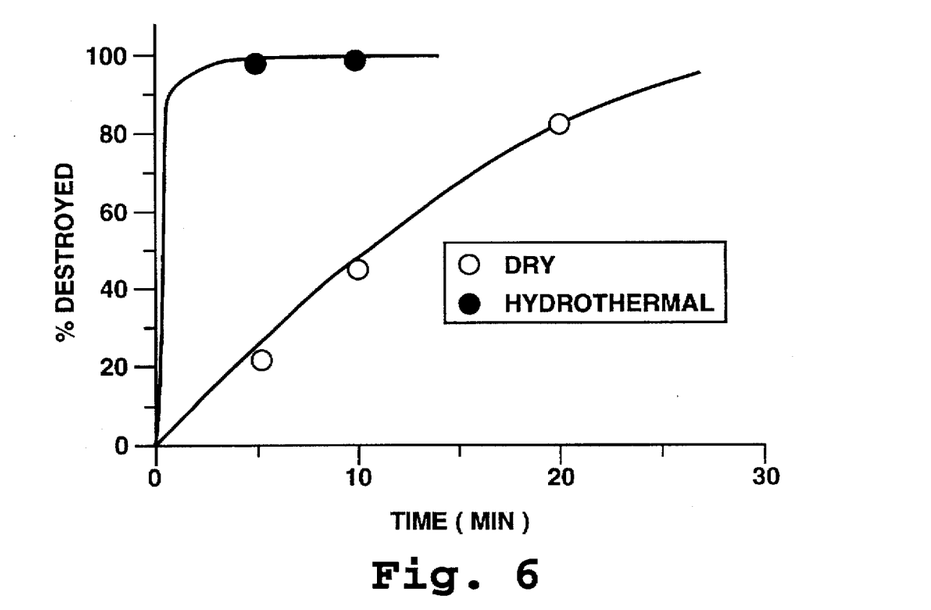
FIG. 6 is a graphic representation of the decomposition of hexachlorobenzene at 380° C. with sodium carbonate.

The data are presented in FIG. 6, at 380° C. (dry and with water) and demonstrate the need to have water present. Thus, in the absence of water, the destruction is slow, but with water present, the rate of reaction is extremely high.

Initial data indicate that a reaction of material with sodium carbonate under the conditions described herein—in the absence of water—also produces useful decomposition of the waste at levels approaching that of the aqueous systems.

The following Examples are presented to be explanatory and descriptive only. They are not to be construed to be limiting in any way.

EXAMPLE 1

Sodium Carbonate Decomposition of ρ-Dichlorobenzene
(a) ρ-Dichlorobenzene (0.108 g, 0.735 mmol) is placed in a metal reactor (6 mL), with water (2 g), sodium carbonate (0.150 g, 1.4 mmol) and oxygen (13.2 mmol). This reaction mixture is heated at 373° C. for 27 min. at 250 atmospheres, then cooled to ambient. The reaction mixture is almost water-clear and shows a total organic carbon (TOC) of less than 0.04 wt. %.

(b) Similarly, when the decomposition in (a) is repeated except that sodium carbonate is replaced by a stoichiometrically equivalent amount of calcium oxide, the amount of the decomposition of organic compound is substantially the same.

(c) Similarly, when the decomposition in (a) is repeated except that sodium carbonate is replaced by a stoichiometrically equivalent amount of calcium hydroxide, the amount of the decomposition of organic compound is substantially the same.

(d) Similarly, when the decomposition in (a) is repeated except that the p-dichlorobenzene is replaced by a stoichiometrically equivalent amount of tetrachlorobenzodioxin, one or more polychlorobiphenyl, one or more polybromobiphenyl methylene chloride, chloroform, carbon tetrachloride, methylchloroform, 1,2-dichloroethane, 1,1,2,2-tetrachloroethane, dichlorofluoromethane, 1,2-dichloro-1,1,2,2-tetrafluoroethane, lindane, hexachlorobenzene, chlorofluorocarbon or combinations thereof, the amount of the decomposition of the organic compound is substantially the same.

(e) Similarly, when the decomposition in (a) is repeated except that the oxygen is replaced with a stoichiometrically equivalent amount of air (having a stoichiometrically equivalent amount of oxygen), ozone, hydrogen peroxide, or combinations thereof, the amount of the decomposition of the organic compound is substantially the same.

EXAMPLE 2

Sodium Carbonate Decomposition of Hexachlorobenzene (a) Hexachlorobenzene is decomposed in the manner described in Example 1 (a). Hexachlorobenzene (0.735 mol) is placed in a metal reactor (6 mL) with water (2 g), sodium carbonate (0.45 g, 4.2 mmol) and oxygen (20 mmol). Hexachlorobenzene has 3 times the organic chlorine to be decomposed. This reaction mixture is heated at 373° C. for 27 min. at 250 atmospheres, then cooled to ambient. The reaction mixture is almost water-clear and shows a total organic carbon (TOC) of less than 0.04 wt. %.

(b) Similarly, when the decomposition in (a) is repeated except that sodium carbonate is replaced by a stoichiometrically equivalent amount of calcium oxide, the amount of the decomposition of organic compound is substantially the same.

(c) Similarly, when the decomposition in (a) is repeated except that sodium carbonate is replaced by a stoichiometrically equivalent amount of calcium hydroxide, the amount of the decomposition of organic compound is substantially the same.

(d) Similarly, when the decomposition in (a) is repeated except that the hexachlorobenzene is replaced by a stoichiometrically equivalent amount of tetrachlorobenzodioxin, one or more polychlorinated biphenyl, methylene chloride, chloroform, carbon tetrachloride, methylchloroform, 1,2-dichloroethane, 1,1,2,2-tetrachloroethane, 1,1,2-trichloroethyline, dichlorofluoromethane, 1,2-dichloro-1,1,2,2-tetrafluoroethane, tetrachloroethylene, lindane, hexachlorobenzene, or combinations thereof, the amount of the decomposition of the organic compound is substantially the same.

(e) Similarly, when the decomposition in (a) is repeated except that the oxygen is replaced with a stoichiometrically equivalent amount of air (having a stoichiometrically equivalent amount of oxygen), ozone, hydrogen peroxide, or combinations thereof, the amount of the decomposition of the organic compound is substantially the same.

EXAMPLE 3

Sodium Carbonate Decomposition of PCB (a) Stainless steel (316) reactors tubing bombs 4.2 cm$^3$ in volume were used. Parallel reaction bombs were loaded with 2.0 g water, 0.5 g $Na_2CO_3$, and either 0.20 µg or 2.00 µg each of the two polychlorinated biphenyl (PCB) compounds, (I and II), see definitions.

The total PCB loadings were therefore 200 and 2000 µg/L of water giving the results shown in FIGS. 9B–9C and 9D, respectively. (The solubilities of structure I and II in water respectively at 25° C. are 90 and 10 µg/L, and thus they were present initially at levels exceeding their solubilities.) Control runs were conducted without added carbonate and without added PCB, the reactors were sealed under argon gas.

Figure 7:
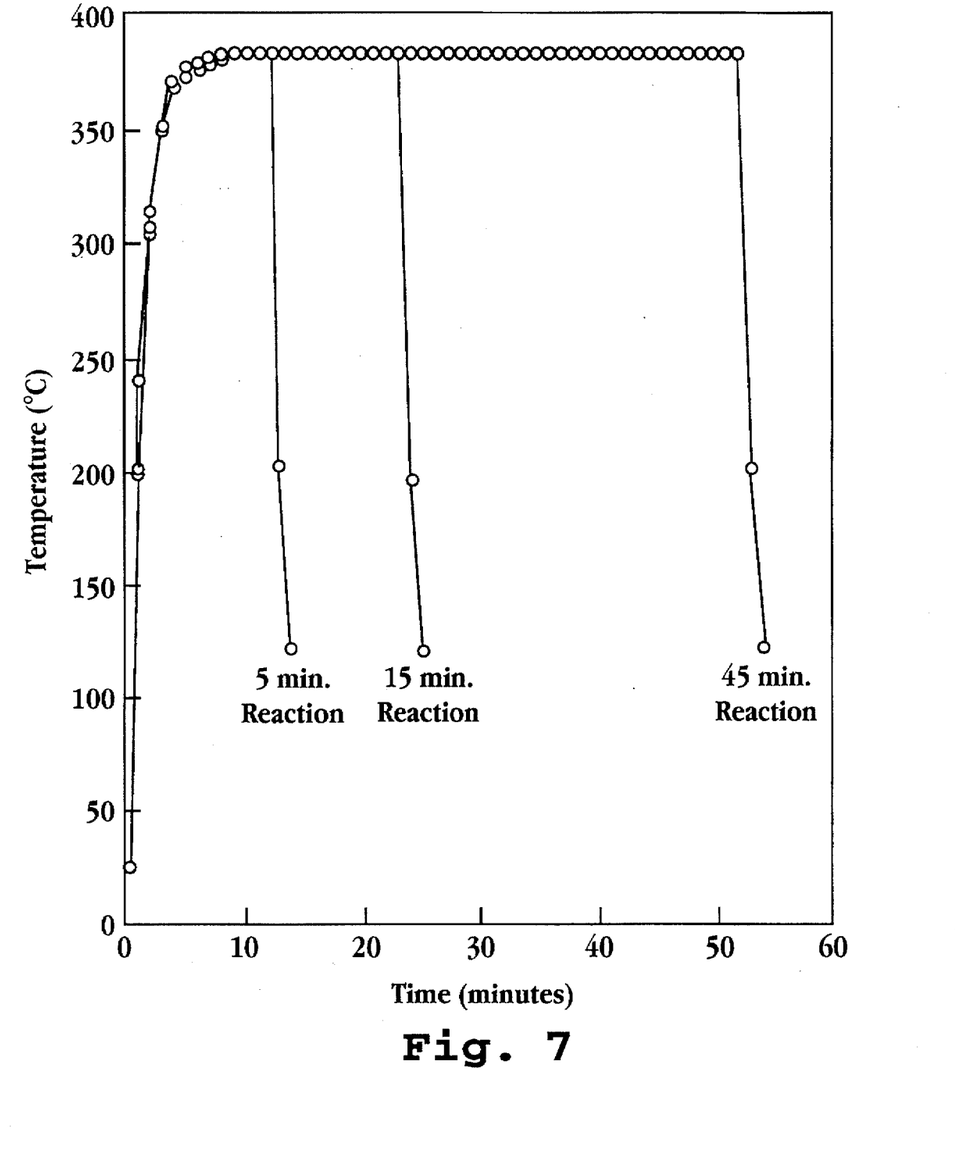
FIG. 7 is a graph of the temperature vs. time heating profile for the decomposition of polychlorinated biphenyl model compounds at 380° C. using a 4.20 cm³ tube reactor at 380° C. showing 5 min, 15 min and 45 min reactions.
Figure 8A:
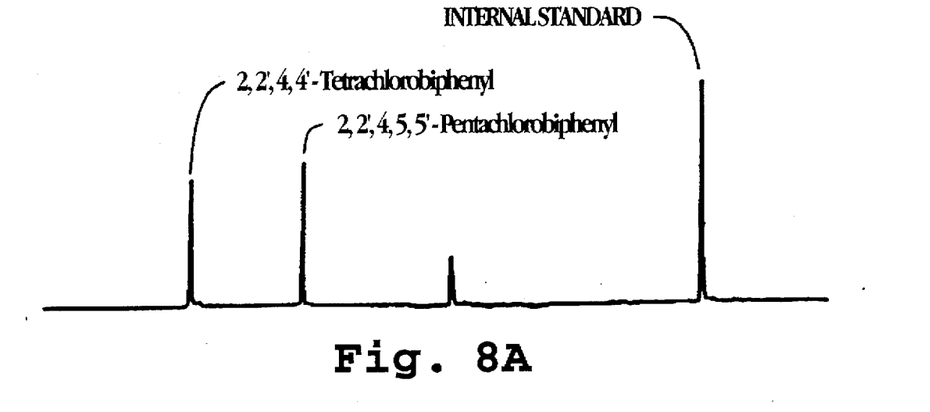
FIGS. 8A, 8B, 8C, 8D and 8E show the gas chromatographic trace of response vs time for PCB levels for samples of 25.0, 12.5, 5.0, 2.5 and 1.0 µg/L, respectively.
Figure 8B:
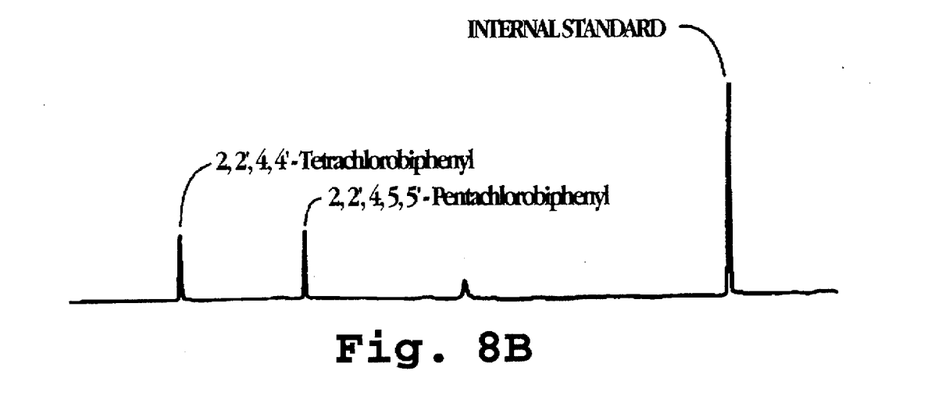
Figure 8C:
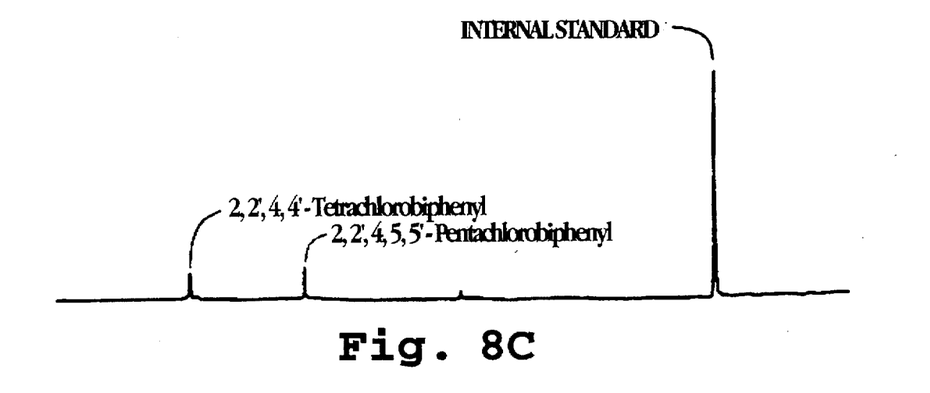
Figure 8D:
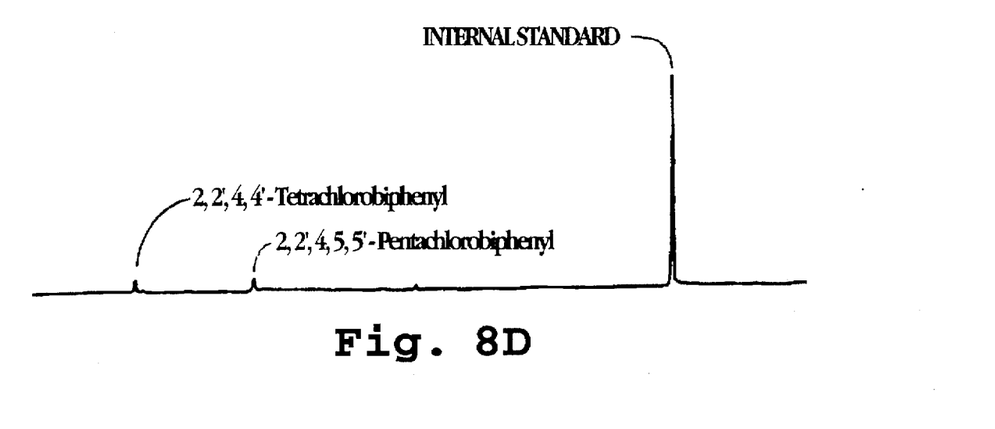
Figure 8E:
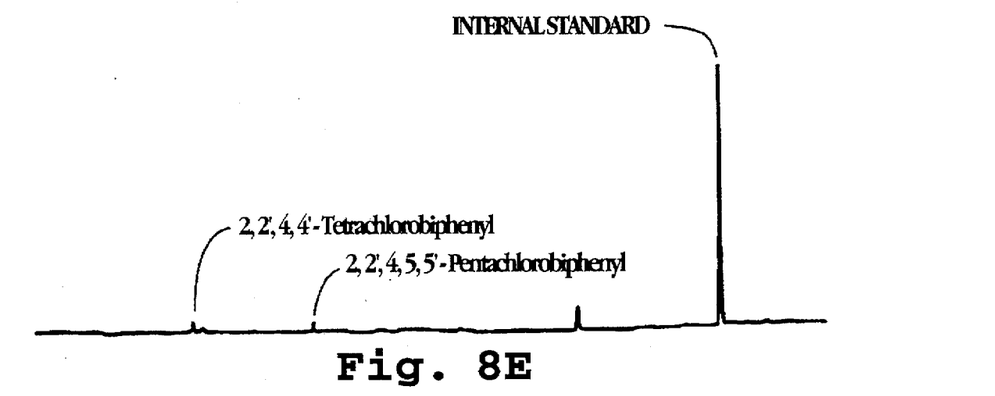

The reactors were heated in a fluidized sand bath at 380° C., and the temperature was monitored using an internal thermocouple. The heating periods were 5, 10, and 15 minutes. The heating profiles presented in FIG. 7 show that heatup time was satisfactorily rapid. After analysis the 5 min data were sufficient for decomposition and are reported.

After cooling, the reactors and reaction products were extracted with dichloromethane, at least 5×2 ml. The dichloromethane fractions were then replaced by hexane (60 ml), an internal standard (octachloronaphthalene) was added, and the final volume of the organic extract was adjusted. Analyses were then conducted by a gas chromatogram (GC) equipped with an electron capture detector (ECD). The PCBs were quantitated using relative response factors. The calibration data are presented in FIGS. 8A to 8E. Responses are apparent for loadings down to the 1 µg/L level; however, quantitative interpretation of signals below the 1.0 µg/L may be in question.

While only a few embodiments of the invention have been shown and described herein, it will become apparent to those skilled in the art that various modifications and changes can be made in the present invention to an improved method of hydrothermal oxidation using specific reactants, such as sodium carbonate, and an oxidant without departing from the spirit and scope of the present invention. All such modification and changes coming within the scope of the appended claims are intended to be carried out thereby.

We claim:

1. A process for the decomposition of material selected from halogenated organic compounds, to compounds which are environmentally acceptable, or which are amenable to further degradation by conventional disposal systems to produce environmentally acceptable products, which process comprises:

(a) conveying an aqueous solution or an aqueous slurry of material to be decomposed into a reaction zone capable of withstanding the temperatures and pressures of decomposition of the material; and (b) contacting the material in the reaction zone in the presence of water with a reactive fluidized bed of a specific reactant present as a solid in an amount effective to decompose the material under hydrothermal water oxidation conditions of between about 300° and 400° C. and a pressure of between about 10 and 400 atmospheres, wherein the specific reactant is at least about 90% insoluble in an aqueous medium at said hot water or supercritical water oxidation conditions, and reacts to neutralize any acid gases produced in the decomposition, and wherein the process occurs in the presence of a gaseous oxidant which is present in an amount of between about 0.1 and 50% by weight of the material to be decomposed;

wherein said reactive fluidized bed is fluidized by said oxidant and said solution or slurry, and wherein said specific reactant is selected from the group consisting of sodium carbonate, calcium oxide, calcium hydroxide, magnesium hydroxide, magnesium oxide, and combinations thereof;

said contacting being carried out for a time sufficient to convert about 99% or greater of the material to compounds which are environmentally acceptable, or to conversion compounds which are amendable to further degradation to environmentally acceptable products.

2. The process of claim 1 wherein the gaseous oxidant is selected from the group consisting of air, oxygen, hydrogen peroxide, ozone and combinations thereof.

3. The process of claim 1 wherein the halogenated organic compounds are selected from the group consisting of at least one tetrachlorobenzodioxin, polychlorinated biphenyl, polybrominated biphenyl, methylenedichloride, trichloromethane, tetrachloromethane, dichloroethylene, trichloroethane, polychlorinatedbenzene, polychlorohexane, chlorinated olefin, methyl bromide, ethyl bromide, dichlorofluoromethane, 1,2-dichloro-1,1,2,2-tetrafluoroethane, and combinations thereof.

4. The process of claim 1 wherein the specific solid reactant is sodium carbonate.

5. The process of claim 1 wherein the materials of construction of the reaction zone are decomposed at 0.001% or less under the hot water or supercritical water oxidation conditions.

6. The process of claim 1 wherein the process occurs with less than 0.1 percent decomposition of the materials of construction of the reaction zone.

7. The process of claim 1 wherein in step (b) the temperature is between about 373° and 400° C. and the pressure is between about 220 and 300 atmospheres.

8. The process of claim 7, wherein the temperature is between about 373° and 400° C., and the specific reactant is sodium carbonate.

9. The process of claim 1, further comprising (c) further degrading the compounds produced in step (b) by subsequent reaction to environmentally acceptable products.

10. The process of claim 9 wherein the materials of construction of the reaction zone are decomposed at 0.1% or less under the supercritical water oxidation conditions.

11. The process of claim 1 wherein in step (b):

the specific solid reactant is sodium carbonate;

the temperature of the reaction is between about 374° and 400° C.;

the gaseous oxidant is air or oxygen; and the time is between about 1 and 60 min.

12. The process of claim 1 wherein in step (b) the gaseous oxidant in the reaction zone is oxygen or air.

13. The process of claim 12 wherein the gaseous oxidant is oxygen.

14. The process of claim 1 wherein in step (b):

the specific solid reactant is sodium carbonate;

the temperature is between about 300° and 374° C.;

the pressure of the reaction is maintained to keep the water present as a gas;

and the time of reaction is between about 1 and 60 min.

15. The process of claim 14 wherein the gaseous oxidant is oxygen or air.

16. The process of claim 15 wherein said halogenated organic compound is selected from the group consisting of at least one tetrachlorobenzodioxin, polychlorinated biphenyl, polybrominated biphenyl, methylenedichloride, trichloromethane, tetrachloromethane, dichloroethylene, trichloroethane, polychlorinated benzene, polychlorohexane, chlorinated olefin, methyl bromide, ethyl bromide, dichlorofluoromethane, 1,2-dichloro-1,1,2,2-tetrafluoroethane, and combinations thereof.

17. The process of claim 1, wherein said halogenated organic compounds are polychlorobiphenyls.

18. The process of claim 17 wherein in step (b) the specific solid reactant is sodium carbonate;

the temperature is about 375° C. to 385° C., and the gaseous oxidant is oxygen or air.

* * * * *